United States Patent
Stoneham et al.

[15] 3,707,118
[45] Dec. 26, 1972

[54] SHUTTER MECHANISM

[72] Inventors: Jeffrey R. Stoneham; Lawrence M. Wood, both of Rochester, N.Y.

[73] Assignee: Eastman Kodak Company, Rochester, N.Y.

[22] Filed: Sept. 13, 1971

[21] Appl. No.: 179,708

[52] U.S. Cl..................................95/62, 95/59
[51] Int. Cl....................................G03b 9/14
[58] Field of Search.............................95/59, 62

[56] References Cited

UNITED STATES PATENTS 3,033,092  5/1962  Ernisse et al. ...........................95/59
3,474,716  10/1969  Wurster...................................95/59

Primary Examiner—Samuel S. Matthews
Assistant Examiner—Russell E. Adams, Jr.
Attorney—W. H. J. Kline et al.

[57] ABSTRACT

A shutter mechanism comprises a set of blades which are rotatable between open and closed positions relative to an exposure aperture wherein an actuating member is coupled to the shutter blades and actuatable by a driver means for moving the shutter blades to the open position. The actuating member is displaceable from a first to a second position wherein a first spring urges the actuating member towards the first position in response to displacement of the actuating member to the second position. A second spring is disposed to be engaged by the actuating member as the actuating member moves to the second position. The second spring is displaced by the actuating member and acts in cooperation with the first spring to drive the shutter actuating member to the first position thereby closing the shutter blades at a preselected shutter speed.

4 Claims, 7 Drawing Figures

LAWRENCE M. WOOD
JEFFREY R. STONEHAM
INVENTORS

ATTORNEYS

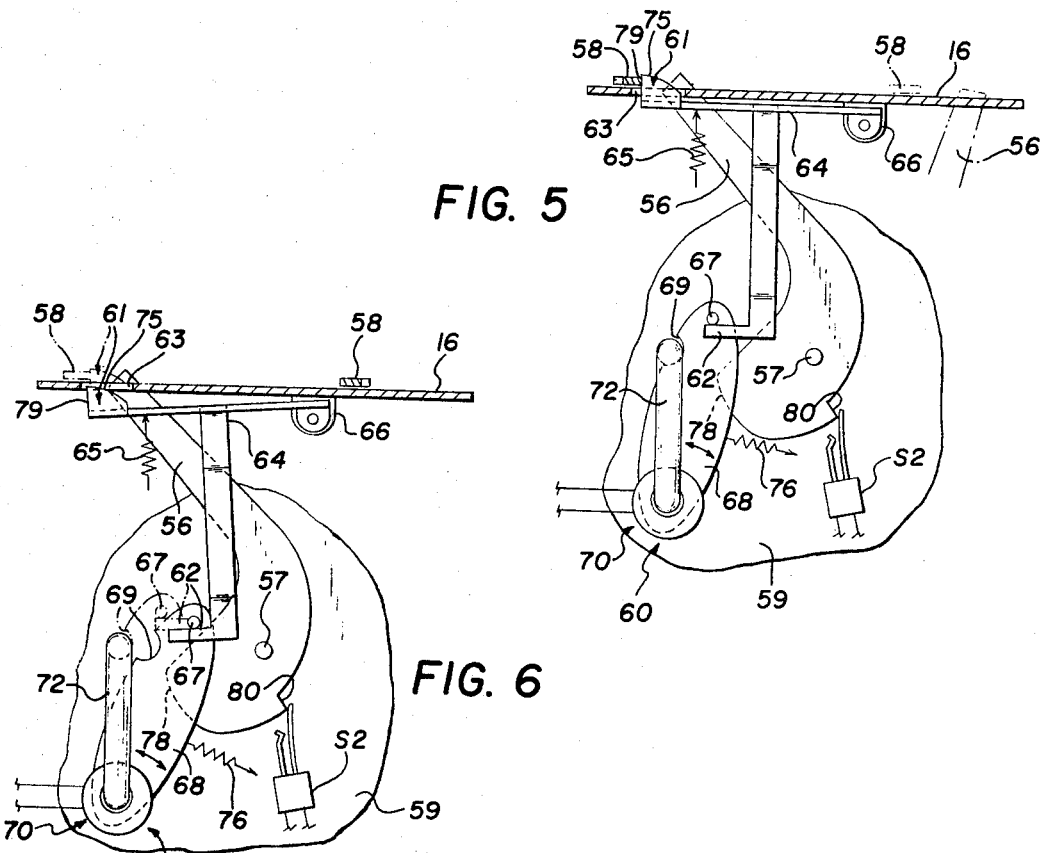
FIG. 5
FIG. 6
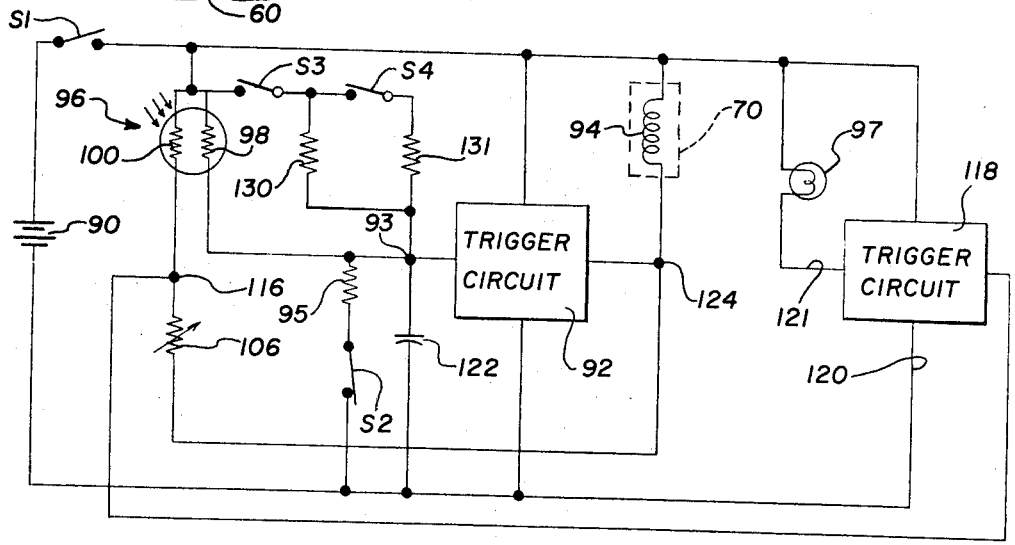
FIG. 7
LAWRENCE M. WOOD
JEFFREY R. STONEHAM
INVENTORS

SHUTTER MECHANISM

CROSS REFERENCE TO RELATED APPLICATIONS

Reference is made herein to commonly assigned and related U.S. Patent application, Ser. No. 179,709 entitled SHUTTER CONTROL MECHANISM, filed in the name of Lawrence M. Wood, on even date herewith.

BACKGROUND OF THE INVENTION

1. Field of the Invention

This invention relates to shutter mechanisms, and in particular to a shutter mechanism for controlling an exposure according to the intensity of incident scene light.

2. Description of the Prior Art

Most inexpensive cameras presently available are equipped to alternatively make daylight or flash exposures, by providing a variety of mechanisms for opening and closing an exposure aperture at a fixed shutter speed. Daylight exposures are commonly made at shutter speeds of about one-sixtieth to one one hundred and twenty-fifth seconds for the aperture settings at which fixed aperture cameras are generally set. On the other hand, flash exposures are generally made at shutter speeds of one twenty-fifth to one-fortieth seconds.

It is frequently desirable in even the most inexpensive cameras to vary the speed of operation of the camera's shutter, in order to enable the camera to make photographic exposures under various conditions.

A means commonly employed in many of these mechanisms providing a fixed shutter speed is to use a strong shutter return spring which biases the shutter to a closed position, and an adjustable rebound stop which is placed in the path of the shutter when a fast shutter speed is desired, to limit its opening movement and thereby reduce the period of time at which exposure aperture in uncovered. Or, to employ variable shutter return springs for regulating shutter speed. Some cameras are provided with strong shutter return springs which are effective to close a shutter to obtain a fast shutter speed, and various retard devices which are introduced to obtain slower shutter speeds. The foregoing shutter mechanisms have known disadvantages which considerably reduce their practical applications, such as their bulk and their unreliability.

Another type of shutter mechanism, which has been found effective to achieve a range of shutter speeds, incorporates an inertia member which is coupled to a shutter blade, and is adapted to swing resiliently and use up the kinetic energy of the blade after it has been stopped in an open position, whereby the closing of the shutter is delayed by a controlled amount. An objection to this type of shutter lies in the amount of space required for the operation of the inertia member.

SUMMARY OF THE INVENTION

Therefore, it is an object of the invention to rapidly close a camera shutter to obtain a fixed shutter speed by means of a mechanism which is easily adapted for adjustment to attain variable shutter speeds.

It is another object of the present invention to control the speed of a camera shutter in a simple manner.

A further object is to provide a compact and effective shutter mechanism which is economical to produce.

Other objects will be apparent from the description to follow and from the appended claims.

These and other objects are achieved according to one illustrative embodiment of the invention by shutter means movable between open and closed positions relative to an exposure aperture wherein moving means is coupled to the shutter means and is actuatable by driver means for moving the shutter means to its open position. The moving means is displaceable from a first to a second position by the driver means and a first spring means urges the moving means towards the first position in response to displacement of the moving means from the first position towards the second position. A second spring is disposed to be displaced and energized by the moving means as the moving means moves towards the second position. The second spring starts the moving means toward the first position and acts in cooperation with the first spring to move the moving means for closing the shutter blades.

BRIEF DESCRIPTION OF THE DRAWING

In the preferred embodiment of the invention described below, reference is made to the accompanying drawing, wherein:

FIG. 5 is a plan view of the mechanism of FIG. 3 in the release state wherein the shutter blades are open and the detent mechanism engages an actuating member;

FIG. 6 is a plan view of the mechanism of FIG. 3 where the detent mechanism has released the actuating member and the shutter blades have closed; and FIG. 7 is a schematic diagram of an electronic circuit for use with the mechanism of FIGS. 1 and 3.

DESCRIPTION OF THE PREFERRED EMBODIMENT

Because photographic cameras are well known in the art, the present description will be directed in particular to elements forming part of, or cooperating more directly with, the present invention, camera elements not specifically shown or described therein being understood to be selectable from those known in the art.

Briefly, the shutter mechanism provided hereby is operable in one of three modes depending upon the intensity level of the scene light. The first mode of operation is a fixed mechanical speed in which a pair of shutter blades are rotatably mounted on a common pivot, and adapted to cover and uncover an exposure aperture in a scissor-like fashion. The movement of the blades is effected by a bifurcated actuating or shutter blade moving member, which is coupled to the blades. The actuating member is biased towards a first position (in which the shutter blades are in their closed or aperture-covering position) by a pair of wire springs which are of sufficient strength to close the shutter from its open or aperture uncovering position to attain a fixed shutter speed. An arm of the actuating member is movable in a path across which lies a portion of one of the springs; the latter is engaged and deflected by the arm of the actuating member as the actuating member is driven to its second position (in which the shutter blades are opened), and this spring portion acts as a "-kick" spring to start the return movement of the actuating member and thus acts together with the first spring to rapidly return the actuating member to its first position to attain the fixed shutter speed.

The shutter mechanism operates in a second mode when scene light intensity is below a predetermined level and too low for the fixed mechanical shutter speed, by providing for a controlled time exposure based on the intensity of incident scene light. An electronic timing circuit provides the controlled time exposure and includes a photosensitive element arranged to receive light for controlling the triggering of a trigger circuit having an output controlling a transducer. the transducer, in turn, operates a detent mechanism for preventing the return movement of the actuating member until the end of the controlled time interval.

The shutter mechanism is operable in a third mode other than the fixed mechanical and timed shutter speeds, for flash photography, wherein the electronic timing circuit includes circuitry that sets a fixed shutter speed for flash photography, commensurate with the useful time of the flash lamp unit used, and further adjusts the shutter speed when the camera is focused for shortened object distance.

Figure 1:
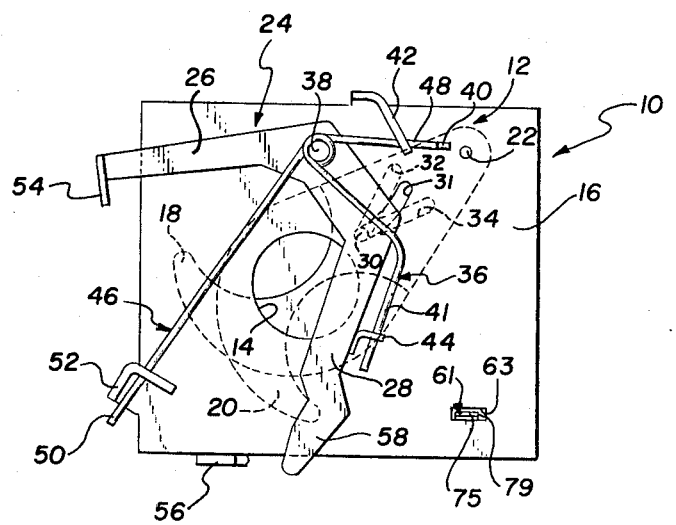
FIG. 1 shows schematically a front view of a shutter mechanism constructed in accordance with the invention, with a pair of shutter blades in a closed position.
Figure 2:
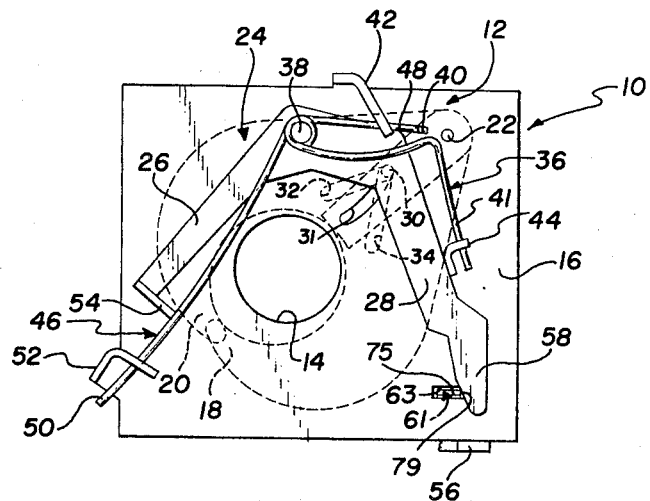
FIG. 2 shows the mechanism depicted in FIG. 1, with the shutter blades open.

Referring now to the drawings, and in particular FIGS. 1 and 2, a camera 10, partially shown, includes a shutter mechanism 12 which is operative to control the opening and closing of an exposure aperture 14 defined in an aperture plate 16. Disposed on one side of the plate 16, as shown by the dotted lines of FIGS. 1 and 2, are a pair of shutter blades 18 and 20, which are mounted for rotation about a common post or pivot 22. Blades 18 and 20 are thus movable in a scissor-like fashion in opposite directions and cooperate to close or cover aperture 14 whenever they overlap, in the area of the aperture.

The shutter blades are movable by a bifurcated actuating member 24, which includes a pair of arms 26 and 28, and a pin 30 which extends through a slot 31 in the aperture plate 16, and through transversely disposed slots 32 and 34 in the shutter blades 18 and 20. An actuating member 24 is mounted for rotation about a post or pivot 38, and the orientation of the slots 31, 32 and 34 is such that the pin 30 simultaneously engages the edges defining the slots 32 and 34 and drives the blades 18 and 20 apart towards their open positions (so as to uncover aperture 14) in response to the counterclockwise rotation of the actuating member 24, and drives the blades 18 and 20 together towards their closed positions (so as to cover aperture 14) in response to the clockwise rotation of the member 24.

A first spring 36, which is preferably a wire spring, is entwined about the post 38 and is held under tension by the retention of its leg 40 behind a tab 42 on the aperture plate 14, and of its leg 41 behind a tab 44 on the arm 28 of the actuating member 24. The spring 36 exerts a clockwise bias on actuating member 24.

A second or "kick" spring 46, which also is preferably a wire spring, is similarly entwined about the post 38, and has a first leg 48 restrained behind the tab 42 on the aperture plate 14, and a second leg 50 restrained against clockwise movement behind another tab 52 on the aperture plate 16. The leg 50 lies in the path of a tab 54 of the arm 26 of the actuating member 24, and when the latter is rotated by a sufficient distance (i.e. when the shutter blades 18 and 20 near the open position) from its first position, the tab 54 engages and deflects the leg 50. The deflection of the leg 50 moves the leg 50 away from the tab 52 as the shutter blades 18 and 20 reach the open position creating tension in the spring 47 to give the actuating member 24 a return kick and assist the spring 36 in driving the actuating member 24 to its first position.

The counterclockwise rotation of actuating member 24 is accomplished by means of a high energy lever or impact driver 56, pivotal on a pin 57 and which is driven from its position shown in FIG. 1 to that shown in FIG. 2 by a driving mechanism which can take a variety of forms which do not comprise part of the invention. The arm 28 of the actuating member 24 includes a nose 58 which lies in the path of the impact driver 56 and is displaceable thereby. The force with which the nose 58 is struck by the impact driver 56 must be sufficient to rotate the actuating member 24 to deflect the springs 36 and 46 and to open the shutter blades 18 and 20.

Figure 3:
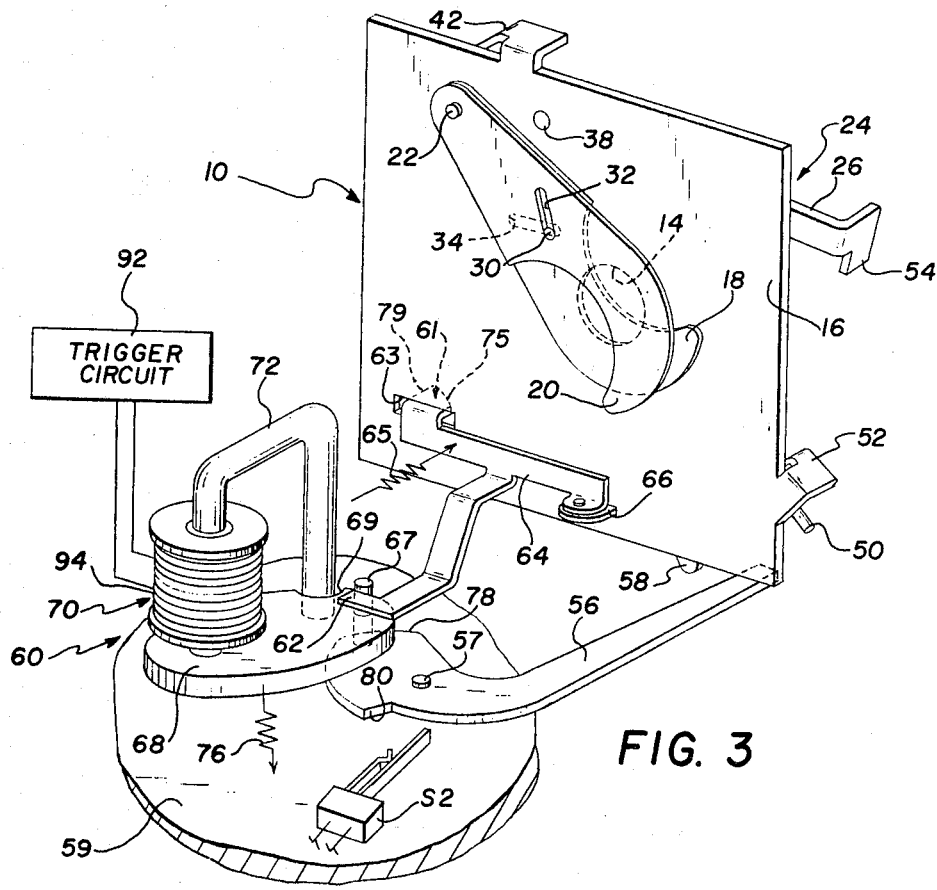
FIG. 3 is a perspective rear view of the mechanism of FIG. 1 showing an electromagnet and detent mechanism for providing a variable shutter speed, the mechanism shown in a cocked position.
Figure 4:
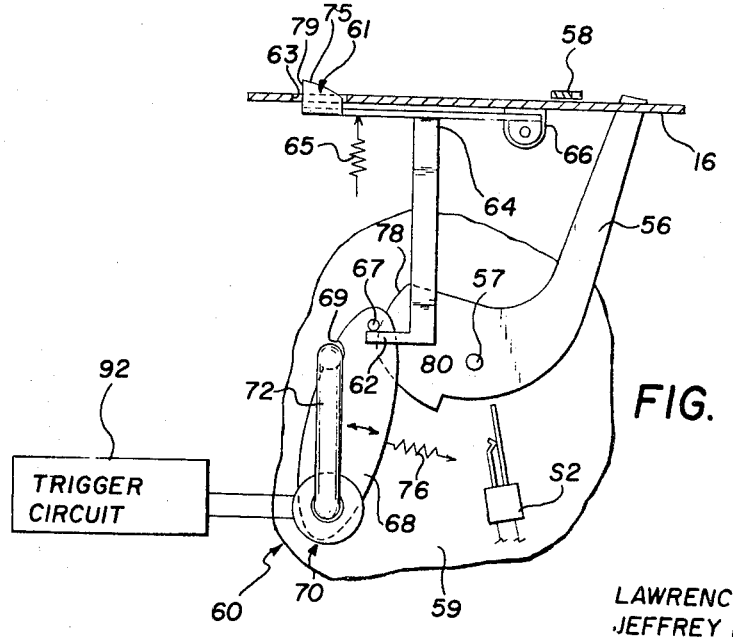
FIG. 4 is a plan view of the mechanism of FIG. 3.

As previously stated, the operation of the shutter mechanism 12 may be in one of three modes, depending upon the intensity of the scene light. To facilitate the multiple modes of operation, there is provided a detent mechanism 60, shown in FIGS. 3–6, and in particular FIGS. 3 and 4, wherein the detent mechanism 60 is shown supported on a camera plate 59. The detent mechanism 60 is disposed relative to an opening 63 of the plate 16, for movement into and out of engaging positions for the actuating member 24. The detent mechanism includes a T-shaped lever 64, one arm of which defines a detent 61, and the other arm is mounted for pivotal movement on a hinge 66, affixed to the plate 16, against a bias of a spring 65. Movement of the detent 61 relative to the opening 63 is accomplished through a pin 67 which is mounted on an armature 68, which armature 68 is movable, as shown by the arrow A, about a yoke 72 of an electromagnet 70, under the bias of spring 76. The strength of the spring 76 is greater than that of the spring 65, and overcomes the spring 65 when the armature pivots. The pin 67 engages a tab 62 on the post of the T-lever 64 when the apparatus is in the position of FIG. 3, and movement of the armature 68 about the yoke 72 pivots the T-lever 64 on the hinge 66, thereby moving the detent 61 into and out of the opening 63. The detent 61 is positioned to protrude through the opening 63 by means of a cam surface 78 on the impact driver 56, which cam surface 78 engages the pin 67, biasing the armature 68 into the yoke 72 wherein a notch 69 engages the yoke 72, thereby positioning the detent 61 in the opening 63. As may best be seen from FIG. 5, when the apparatus operates in ambient scene light, the first mode of operation as previously discussed, the impact driver 56 moves to engage the actuating member 24, and the cam surface 78 rotates, releasing the pin 66. As shown in FIG. 6, the cam surface 78 releases the pin 67 and the armature 68 pivots on the yoke 72 under the bias of the spring 76 pivoting the T-lever 64 on the hinge 66, removing the detent 61 from the opening 63. In this manner, the nose 58 moves back over the opening 63 allowing the blades 18 and 20 to close at a fixed rate.

When the intensity of the scene light is too low for exposure in the fixed shutter speed mode of operation, an electronic circuit to be discussed later, is operative to control the detent mechanism 60 in a manner to maintain the detent 61 in the opening 63 as shown by the phantom lines of FIG. 6, for engaging the nose 58, thus preventing the actuating member 24 from closing the blades 18 and 20. During this timed mode of operation, the electromagnet 70 becomes energized and the armature 68 is attracted to the yoke 72, the position of FIG. 3. Therefore, the armature 68 is not free to pivot about the yoke 72 as the impact driver 56 moves to open the blades 18 and 20 and the T-lever 64 is maintained with the detent 61 protruding through the opening 63. To facilitate the movement of the nose 58 over the opening 63, but engage the nose 58 as it attempts to move back over the opening 63, the detent 61 is provided with a cam surface 75 and a square surface 79, as may be best seen in FIG. 4, which cam surface 75 is engaged by the nose 58 of the actuating member 24 as it moves to open the blades 18 and 20. As the nose 58 engages the cam surface 75, the T-lever 64, being freely movable on the hinge 66, against the bias of the spring 65, will move out of the opening as the actuating member 24 engages it, allowing the actuating member 24 to move past the opening 63. However, prior to the return movement of the nose 58, the spring 65 will move the T-lever 64 back into a position wherein the detent 61 protrudes into the hole 63, and the square surface 79 will engage and hold the nose 58 as the springs 36 and 46 move the actuating member 24 to close the blades 18 and 20. A switch S2 is positioned adjacent to a cam lobe 80 on the cam surface 78 so that as the impact driver 56 moves to engage the actuating member 24 to open the blades 18 and 20, the cam lobe 80 opens the switch S2. The switch S2 is a timing switch in the electronic circuit, which when opened, initiates the timing cycle as will be described in more detail later. The nose 58 will be held for a time interval that depends upon the operation of the electronic circuit of FIG. 7.

The circuit of FIG. 7 is adapted to be actuated as a switch S1 is closed upon a slight actuation of the camera release member, not shown. Closure of the switch S1 connects a battery 90 in circuit with a trigger circuit 92 which serves, as will be explained, to energize a coil 94 associated with the electromagnet 70. The trigger circuit 92 is adapted to be conducting or non-conducting immediately upon closure of the switch S1, depending upon the intensity of the scene light. If intensity of the scene light is above a first predetermined value, the trigger circuit 92 is biased to the non-conducting state, as will be explained subsequently. If the intensity of the scene light is below this predetermined value, upon application of the potential, the trigger circuit 92 is immediately disposed from a first or the non-conductive state to a second or conductive state to thereby establish a conductive path through the coil 94 in circuit with the battery 90. As a result, the electromagnet 70 is energized and the armature 68 is attracted to, and held by the yoke 72. If the scene light is relatively high, or above the first predetermined value, the trigger circuit 92 is biased in the second or non-conducting state, thereby maintaining the electromagnet 70 in the deenergized state.

If the scene illumination is below a second predetermined level, an indicator lamp 97 will be energized to provide an indication thereof. The indicator lamp 97 is operated in conjunction with a radiation sensitive assembly 96 which includes first and second radiation sensitive elements 98 and 100, both responsive to the incident scene radiation to vary a parameter, e.g. electrical resistivity, as a function of the incident scene radiation. When the trigger circuit 92 is disposed in its first or conductive state, a circuit is established through radiation sensitive element 100 and variable impedance 106 to the negative terminal of the battery 90, so that the impedance 106 and element 100 form a voltage dividing network, the junction point of which is connected to an input terminal 116 of a trigger circuit 118. If the resistivity of the radiation sensitive element 100 exceeds a predetermined value, i.e., the incident scene radiation is below a second predetermined value lower than the first value, a signal will be applied to the input terminal 116 which will dispose the trigger circuit 118 from its first or nonconductive state to a second or conductive state to thereby provide a conductive path between its terminals 120 and 121 and to energize the indicator lamp 97. The energized lamp 97 indicates that the incident scene illumination is too low to provide a normal exposure without the aid of an additional light source or camera support.

The switch S2, normally in a closed condition, short-circuits a capacitor 122 to ground, and the switch S2, when opened, initiates the exposure interval. More specifically, a time integration circuit is formed by the capacitor 122 and the radiation sensitive element 98. The capacitor 122 charges at a rate determined by resistivity of the element 98; therefore, a potential at a junction 93 therebetween increases at a rate which is a function of the incident scene radiation. When the capacitor 122 has charged to a level corresponding to the threshold level of the trigger circuit 92, the circuit 92 is disposed from its second or conductive state to its first or nonconductive state to thereby de-energize the coil 94. The threshold level of the trigger circuit is set illustratively at a value of .6 times the voltage of the battery 90. This threshold level whereby the trigger circuit 92 is biased to the non-conducting state may be reached in a second manner by means of a resistance 95 connected in series with the element 98 to thereby form a voltage dividing network for establishing a voltage at junction 93 immediately after the switch S1 is closed. If scene light is high, the impedance of the element 98 will reach a preselected value which establishes a voltage level at the junction 93 (immediately upon closure of the switch S1) sufficient to render the trigger circuit 92 to its nonconductive state and, consequently the electromagnet 70 will not become energized.

A feed-back path is provided between an output terminal 124 of the trigger circuit 92 and the input terminal 116 of the trigger circuit 118. As a result, when the trigger circuit 92 is disposed in its first or nonconductive state, the circuit between the input terminal 116 of the trigger circuit 118 through the variable impedance 106 and the negative terminal of the battery 90 is broken and the potential applied to the input terminal 116 approaches that potential of the positive terminal of the battery 90. At this more positive potential, the trigger circuit 118 is disposed in its first or nonconductive state to thereby de-energize the indicator lamp 97. As a result of the feed-back-path the indicator lamp 97 is used to not only indicate a low light condition under which sufficient film exposure cannot be achieved without the aid of an additional light source or camera support, but also to indicate the termination of an extended or timed exposure.

A further feature is provided in the circuit of FIG. 7 for use when the scene illumination is below the second preselected intensity level, in that, a switch S3 is disposed to couple a resistance 130 in parallel circuit with the element 98. The switch S3 may for example be actuated by insertion of a flash lamp unit (not shown) into a camera receptacle (not shown). By actuating the switch S3, the parallel combination of the element 98 and resistance 130 is connected in circuit between the battery 90 and the capacitor 122. The resistance of the combination is light dependent but provides a maximum time interval of an open shutter condition for use in flash photography. A second switch S4 is adapted to couple a resistance 131 in parallel circuit with the resistance 130 and element 98 by means of, for example, a focus adjustment for photography at shortened object distance. When the switches S3 and S4 are both closed during the time interval of exposure, the parallel resistance established by resistances 130, 131 and the element 98 reduces the composite value of the elements by an amount sufficient to reduce the exposure interval for exposure to be taken at a shortened object distance. It is to be noted in FIG. 7, that the switch S4, if closed without a flash lamp unit inserted in the camera for closing the switch S3, is not effective to reduce the time interval of exposure from that established by the element 112 and the capacitor 122.

In the operation of the shutter mechanism 12, during the first mode of operation when scene light intensity is high, the electronic trigger circuit 92 is biased to the non-conducting state by the voltage divider resistance of element 98 and resistor 95 at junction 93. An operator actuates a camera release, not shown, releasing the impact driver 56 for movement under its bias, the impact driver 56 engages the nose 58 of the actuating member 24, pivoting the actuating member 24 counter-clockwise. Remembering that the trigger circuit 92 is in the nonconductive state, the electromagnet 70 is not energized, and the armature 68 is not attracted to the yoke 72 and is free to pivot on the yoke 72. The armature 68 being free to pivot, allows T-lever 64 to pivot on the hinge 66 and remove detent 61 from the opening 63. The pin 30 moves in slots 31, 32 and 34 as the blades 18 and 20 open, as shown in FIG. 2, permitting scene light to pass through the exposure aperture 14. As further shown in FIG. 2, the movement of the actuating member 24 creates tension in the spring 36 as the blades 18 and 20 open, and the detent 54 of the arm 26 engages the spring 46, deflecting the spring 46 away from tab 52. This deflection of the spring 46 produces tension in the spring 46, and the spring 46 acts as a "kick" spring to give the actuating member 24 an initial start back to the closed position of the blades 18 and 20. When the tension of the spring 46 is added to the tension of the spring 36, the blades 18 and 20 are rapidly closed by pivoting the actuating member 24 clockwise. The shutter speed thus obtained is a fixed shutter speed which may be set at the desired rate of opening and closing by adjusting the tension in the springs 36 and 46.

In a second mode of operation when the scene light is below the first predetermined value, the voltage level at the junction 93 is below the level which biases the trigger circuit 93 into the nonconductive state and the trigger circuit 92 is biased in the conductive state when switch S1 is closed. As in the operation previously described, the impact driver 56 moves to engage the arm 28 of the actuating member 24, and pivots the actuating member 24 to open the blades 18 and 20. The movement of actuating member 24 brings nose 58 over the opening 61 into engagement with the detent 61 protruding therethrough, as shown in FIG. 6. The trigger circuit 92 is in the conductive state and the electromagnet 70 is energized, and the armature 68 is attracted to the yoke 72; and therefore the bias of the spring 76 does not privot the armature 68 as the cam surface 78 moves away from pin 66. The T-lever 64 is therefore maintained in the position of FIG. 4 under the bias of the spring 65, wherein the detent 61 protrudes through the opening 63. As the nose 58 engages the cam surface 75, the T-lever is pivoted on the hinge 66 momentarily removing the detent 61 from the opening 63; however, the bias of the spring 65 is sufficient to move the detent 61 back into the opening 63 as the nose 58 passes the opening 63, and the square surface 79 engages the nose 58, as shown by FIG. 5. As the impact driver 56 moves, the cam lobe 80 engages the switch S2, opening the switch to start the time interval; and at the end of the time interval, the trigger circuit 92 is switched to the nonconductive state, thereby de-energizing the electromagnet 70. As the flux field of the electromagnet collapses, the yoke 72 and the armature 68 separate, and under the bias of the spring 76 the armature pivots, pivoting the T-lever 64. As the T-lever 64 pivots, the detent 60 moves out of the opening 61 freeing the arm 28, and the shutter blades 18 and 20 close the aperture 14.

The operation of the apparatus in the third mode of operation may be used if desired when the intensity of the scene light is below the second preselected level. Operation of the camera at the lower light intensity may be accomplished in the second mode, however, due the low level of light, producing a high resistance in the element 98, the time constant of the integrating circuit is long, and the shutter remains open for an extended time interval. The operation in the third mode, therefore, establishes a maximum time interval for flash photography and the basic operation of the apparatus the same as that of the second mode. In the third mode, the switch S3 is closed, connecting the parallel combination of the resistor 130 and element 98 in series with the capacitor 122 for establishing a time constant for the integrating circuit. The time constant allows the trigger circuit 92 to be switched to the nonconducting state at a preselected time to allow closure of the blades 18 and 20 at a shutter speed commensurate with the useful duration of the light from the flash lamp.

The invention has been described in detail with particular reference to preferred embodiments thereof, but it will be understood that variations and modifications can be effected within the spirit and scope of the invention.

We claim:

1. Shutter apparatus for effecting exposures of a light sensitive medium to scene light through an exposure aperture, said shutter apparatus comprising:
    a. shutter means movable between a closed position in which the exposure aperture is covered and an open position in which the exposure aperture is uncovered for the passage of scene light therethrough;
    b. means coupled to said shutter means for moving said shutter means between said open and closed positions, said moving means being displaceable from a first position to a second position for moving said shutter means to its open position, and from the second position to the first position for moving said shutter means to its closed position;
    c. first spring means for urging said moving means from the second position to the first position;
    d. second spring means for urging said moving means towards the first position in response to the displacement of said moving means from the first position towards the second position; and
    e. drive means for displacing said moving means from the first position to the second position.

2. Apparatus according to claim 1 wherein said moving means comprises a member having first and second arms mounted for rotation about a pivot, said first arm being engageable by said drive means for rotating said moving means to the second position, said first arm engageable by said first spring for urging said moving means toward said first position, and said second arm being engageable by said second spring means in response to the rotation of said moving means towards the second position, said second spring means being deflectable by said moving means and creating tension to displace said moving means towards the first position.

3. Apparatus according to claim 2, wherein said first spring means is a wire spring entwined about said pivot of said moving means and having a portion engageable with said moving means for biasing said moving means towards the first position, and said second spring means is a wire spring entwined about said pivot of said moving means and having a portion deflectable by said moving means to render said portion effective to bias said moving means towards the first position.

4. Apparatus according to claim 1 wherein:
    said shutter means comprises a pair of shutter blades pivotably mounted on a common post and rotatable in opposite directions about said post, said blades overlapping across the exposure aperture when in the closed position and being separated when in the open position, and
    said moving means is coupled to said shutter blades by a pin connected to said moving means for movement in simultaneous engagement with said blades in a path extending generally towards said post to move said blades to the open position in response to the displacement of said moving means towards the second position.

* * * * *